United States Patent
Anei

(10) Patent No.: US 7,269,281 B2
(45) Date of Patent: Sep. 11, 2007

(54) METHOD FOR MEASURING OBJECT BASED ON IMAGE AND PHOTOGRAPHING APPARATUS

(75) Inventor: Shin Anei, Takarazuka (JP)

(73) Assignee: Minolta Co., Ltd., Osaka (JP)

( * ) Notice: Subject to any disclaimer, the term of this patent is extended or adjusted under 35 U.S.C. 154(b) by 824 days.

(21) Appl. No.: 10/463,784

(22) Filed: Jun. 17, 2003

(65) Prior Publication Data

US 2004/0184656 A1 Sep. 23, 2004

(30) Foreign Application Priority Data

Mar. 19, 2003 (JP) ............................. 2003-075658

(51) Int. Cl.
*G06K 9/00* (2006.01)

(52) U.S. Cl. .................................... 382/154

(58) Field of Classification Search ................ 382/103, 382/154, 216; 345/419, 420; 348/47–48
See application file for complete search history.

(56) References Cited

U.S. PATENT DOCUMENTS

| | | | | |
|---|---|---|---|---|
| 6,005,987 A | * | 12/1999 | Nakamura et al. | 382/294 |
| 6,097,850 A | * | 8/2000 | Watanabe et al. | 282/275 |
| 6,236,748 B1 | * | 5/2001 | Iijima et al. | 382/154 |
| 6,768,813 B1 | * | 7/2004 | Nakayama | 382/154 |
| 6,909,458 B1 | * | 6/2005 | Suzuki et al. | 348/211.8 |
| 6,943,829 B2 | * | 9/2005 | Endo et al. | 348/207.11 |
| 7,081,918 B2 | * | 7/2006 | Takemoto | 348/223.1 |

FOREIGN PATENT DOCUMENTS

| | | |
|---|---|---|
| JP | 11-053548 | 2/1999 |
| JP | 2000-003448 | 1/2000 |
| JP | 2001-154089 | 6/2001 |
| JP | 2002-216125 | 8/2002 |
| JP | 2002-218506 | 8/2002 |
| JP | 2002-218507 | 8/2002 |

OTHER PUBLICATIONS

Japanese Office Communication dated Feb. 21, 2006, for counterpart Japanese Patent Application No. 2003-075658.

* cited by examiner

*Primary Examiner*—Daniel Mariam
(74) *Attorney, Agent, or Firm*—Sidley Austin LLP

(57) ABSTRACT

A method is provided that can conduct accurate correspondence of images in measuring an object based on images obtained by plural cameras so that measurement of the object is conducted precisely. The method includes the steps of capturing plural images by plural cameras, using an image in a photographing area common to the images, ex. image information obtained from an area that is set as a specific area to set camera parameters, using the set camera parameters to photograph the same photographing areas as those when the camera parameters are set so as to capture images anew, the photographing being performed by the plural cameras, determining corresponding points in the newly captured images, and obtaining three-dimensional information of the object included in a photographing area.

20 Claims, 8 Drawing Sheets

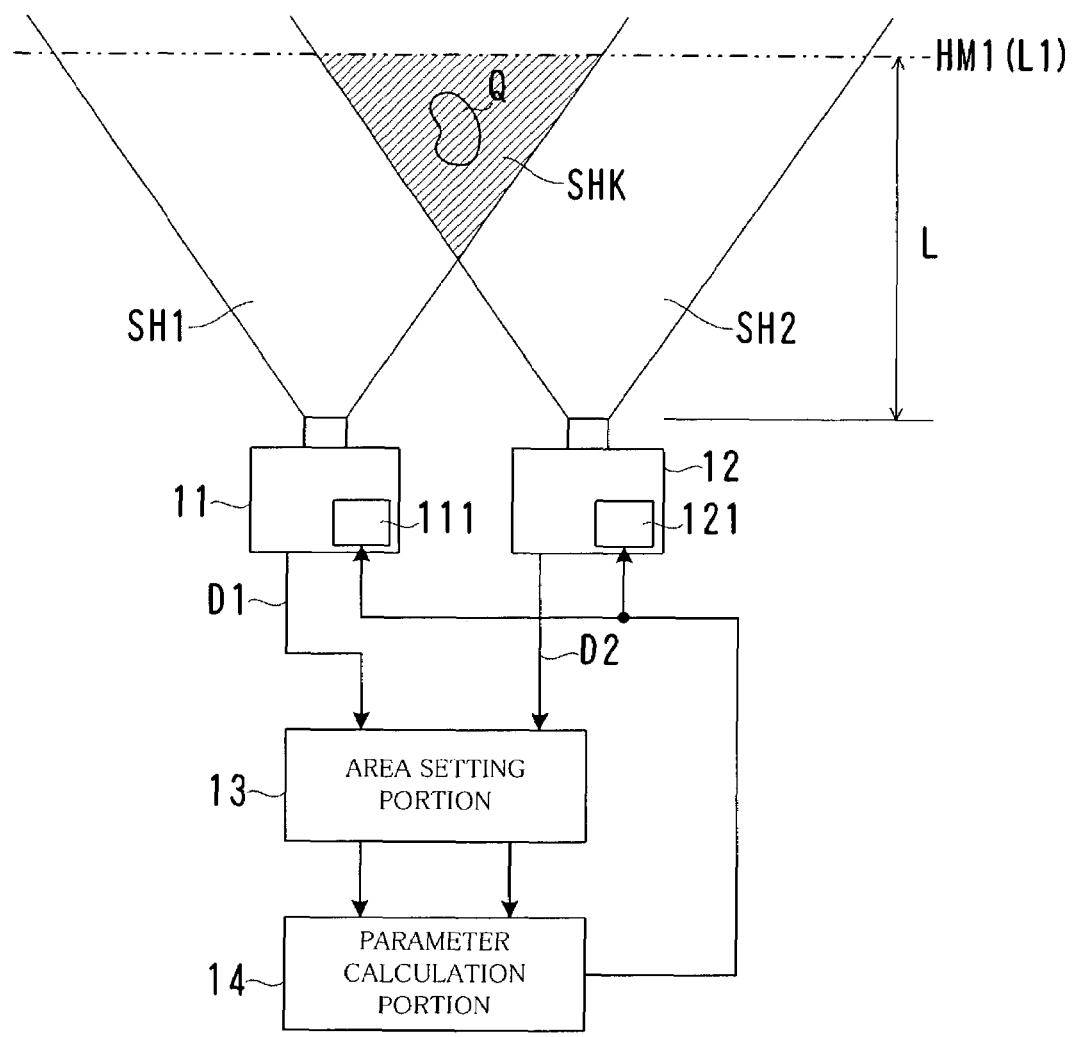

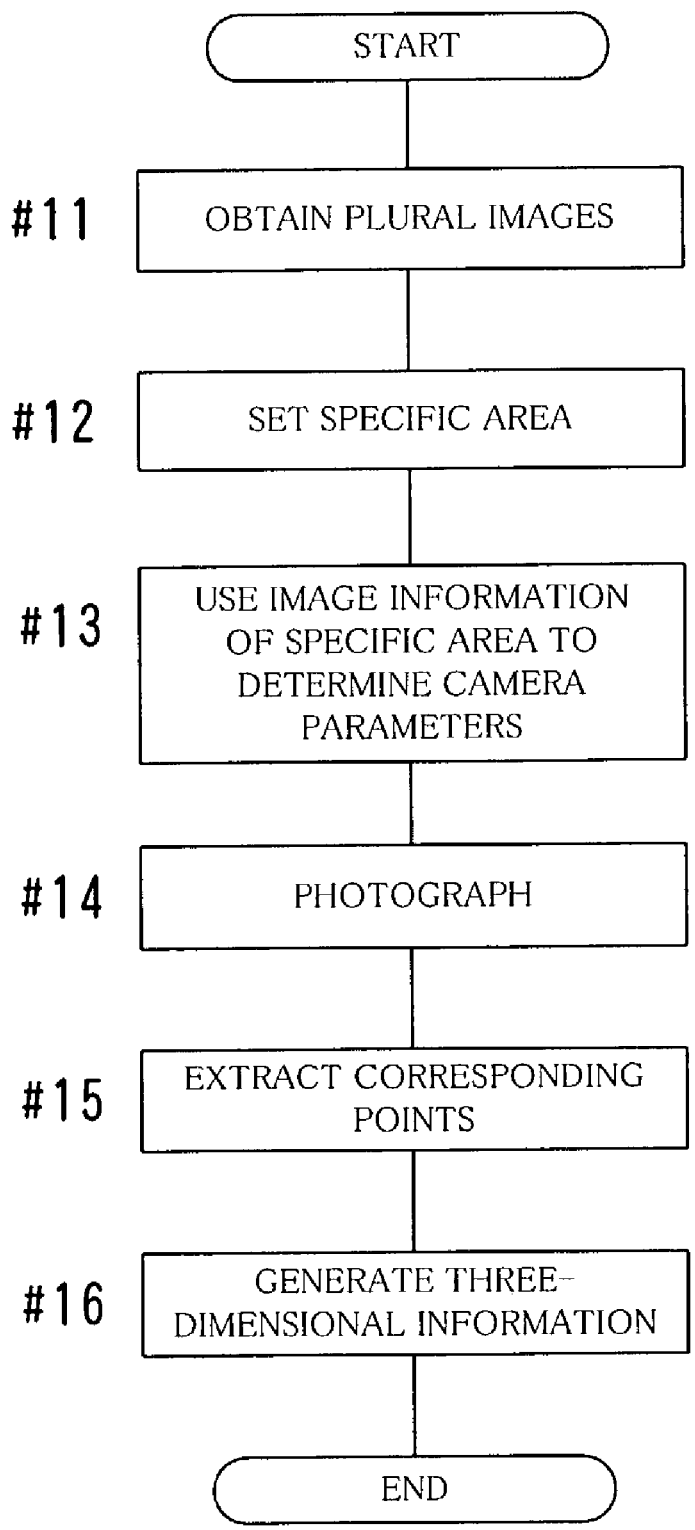

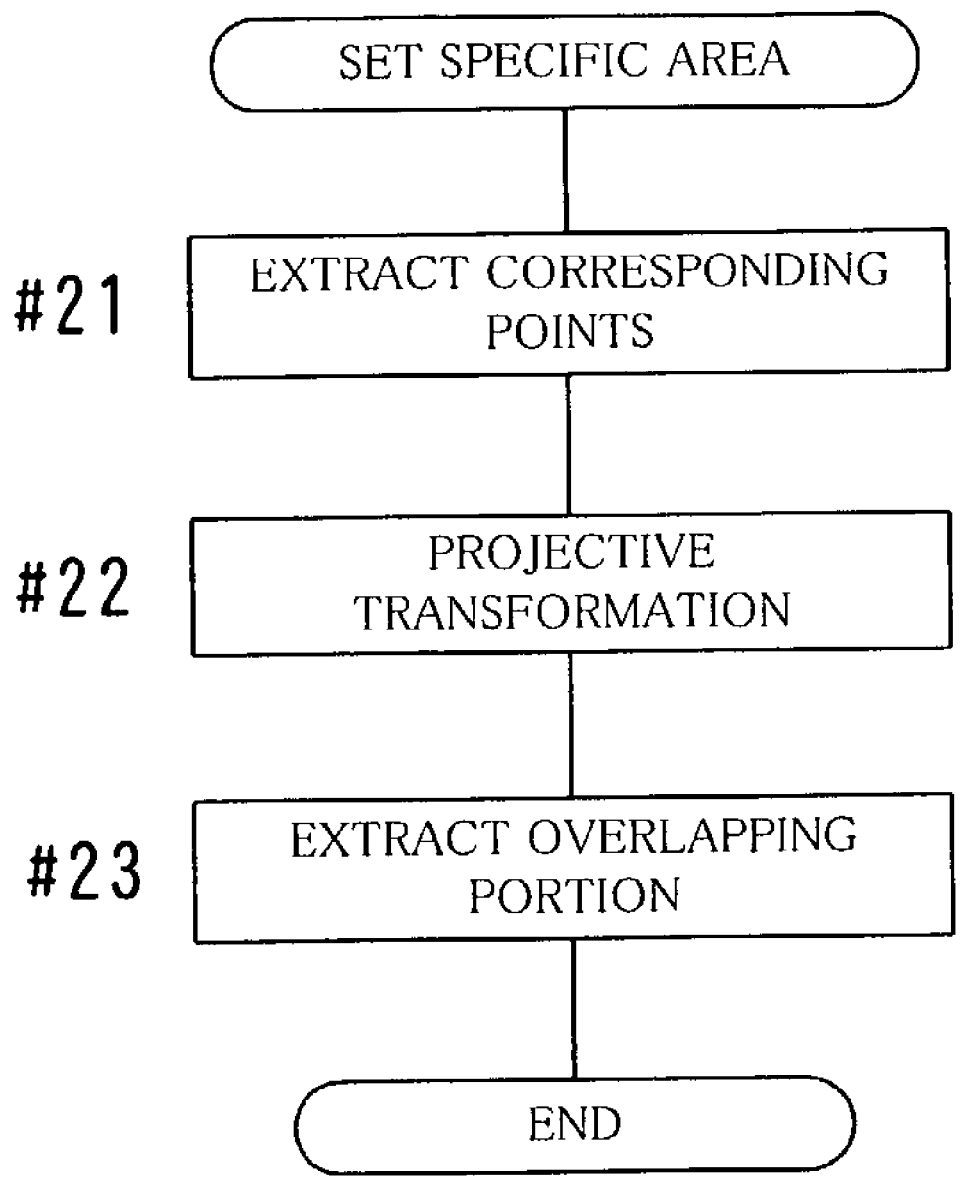

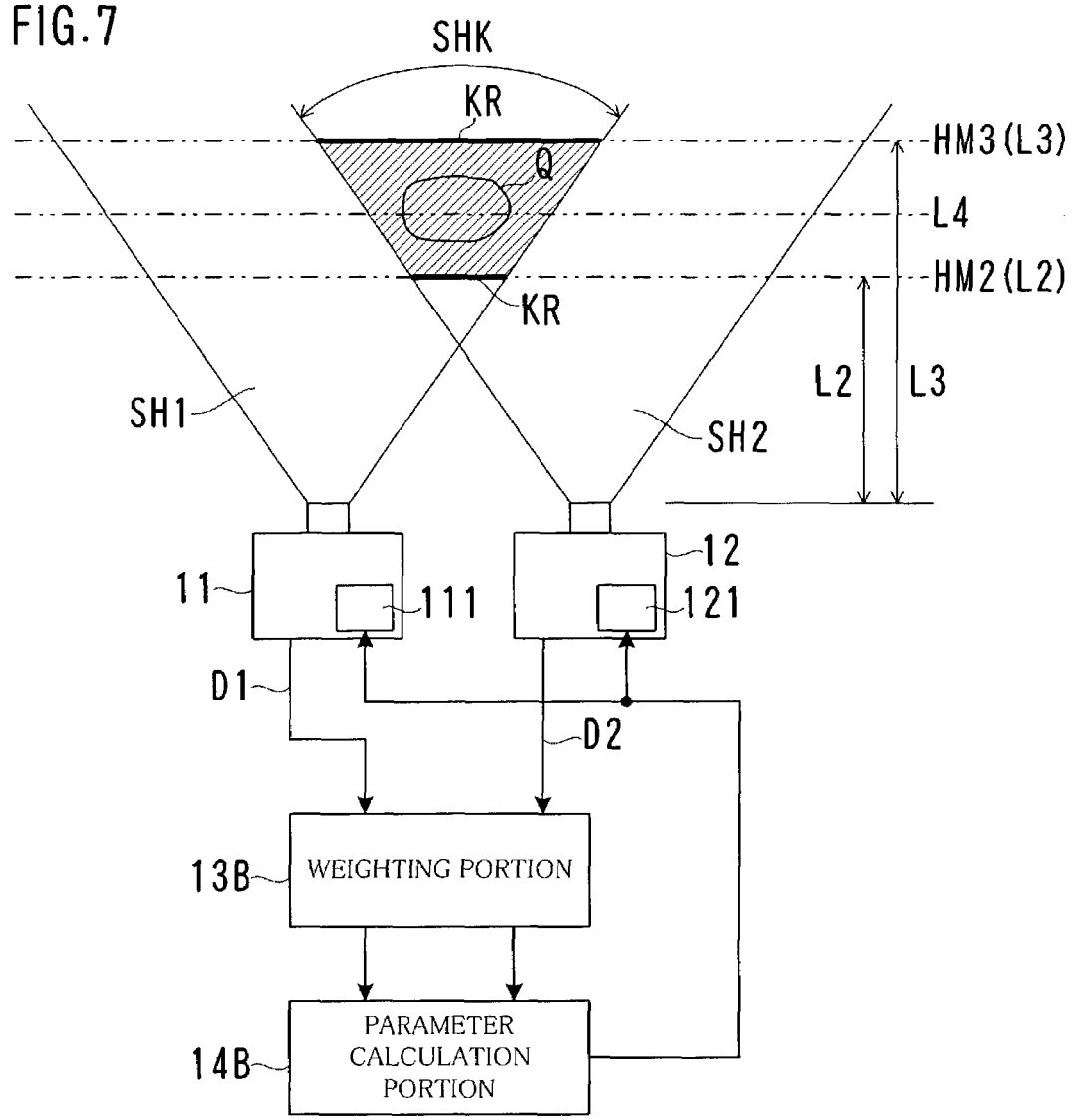

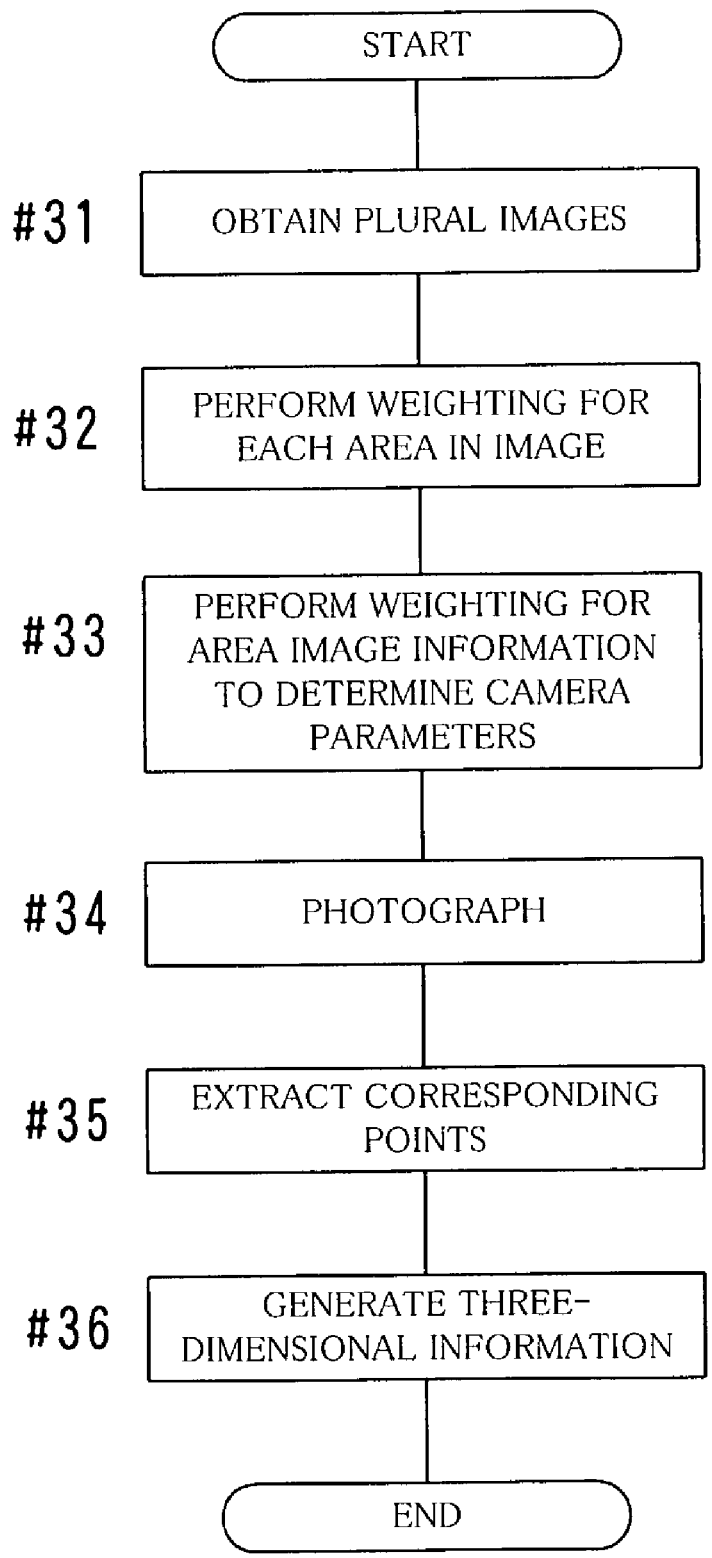

METHOD FOR MEASURING OBJECT BASED ON IMAGE AND PHOTOGRAPHING APPARATUS

This application is based on Japanese Patent Application No. 2003-075658 filed on Mar. 19, 2003, the contents of which are hereby incorporated by reference.

BACKGROUND OF THE INVENTION

1. Field of the Invention

The present invention relates to a method for measuring an object based on images obtained by plural cameras and a photographing apparatus used for the method.

2. Description of the Prior Art

Conventionally, a method is known in which an object is measured based on images captured by plural cameras to obtain three-dimensional information such as distance images of the object. Further, various photographing apparatuses for photographing such images are known.

In order to obtain three-dimensional information based on two images, extraction of corresponding points in the two images is required. However, since images captured by the conventional photographing apparatuses differ from each other in luminance, color balance or focus states in corresponding points, accurate extraction of corresponding points is difficult.

Japanese unexamined patent publication Nos. 2002-218506 and 2002-218507, for example, disclose a photographing apparatus in which a stereo adapter is attached to one optical system to obtain stereo images. According to this photographing apparatus, capture of images from two virtual viewpoints is possible in one optical system. However, the photographing apparatus cannot perform an AE (Auto Exposure) operation or an AWB (Auto White Balance) operation for each image individually. Thus, two images differ from each other in luminance or color balance in corresponding points, making accurate correspondence difficult.

In order to solve this problem, it is proposed that luminance in plane parts seen common to two images is compared to each other to correct a luminance value of the entire image (Japanese unexamined patent publication No. 2002-216125).

More specifically, according to the publication, luminance in regions common to two images is compared to each other to make correction to the image. However, it is intended to equalize luminance of images by making correction to the image after photographing, and therefore luminance of images cannot be equalized sufficiently depending on image states. Further, when images differ from each other in color balance or focus states, it is almost impossible to equalize color balance or focus states through correction. Accordingly, accurate correspondence is difficult and three-dimensional information with good degree of precision concerning an object cannot be obtained.

Related Patent Publication 1:
  Japanese unexamined patent publication No. 2002-218506

Related Patent Publication 2:
  Japanese unexamined patent publication No. 2002-218507

Related Patent Publication 3:
  Japanese unexamined patent publication No. 2002-216125

SUMMARY OF THE INVENTION

The present invention is directed to solve the problems discussed above. An object of the present invention is to allow for accurate correspondence of images in measuring an object based on images obtained by plural cameras. Another object of the present invention is to conduct measurement of an object precisely.

According to one aspect of the present invention, a method for measuring an object based on images includes capturing the images by plural cameras, using more image information obtained from an image in a photographing area common to the images captured by the cameras than image information obtained from an image in an area other than the common photographing area to set camera parameters, using the set camera parameters to photograph the same photographing areas as those when the camera parameters are set so as to capture images anew, the photographing being performed by the cameras, determining corresponding points in the newly captured images, and obtaining three-dimensional information of the object included in a photographing area.

According to another aspect of the present invention, a photographing apparatus includes plural cameras capable of photographing an object from viewpoint positions where the cameras have parallax for the object, and of performing individual photograph control based on camera parameters, a weighting portion for weighting to an image so that a weight is larger in an area where possibility that fields of view are overlapped is high within a photographing area of each of the cameras, a calculation portion for calculating each of the camera parameters using information of the image to which weighting is performed depending on an area, and a photograph control portion for performing photograph control of each of the cameras based on each of the calculated camera parameters.

These and other characteristics and objects of the present invention will become more apparent by the following descriptions of embodiments with reference to drawings.

BRIEF DESCRIPTION OF THE DRAWING

FIG. 1 is a diagram showing a structure of a photographing apparatus according to a first embodiment of the present invention.

FIG. 5 is a flowchart showing the entire operation in the photographing apparatus.

FIG. 6 is a flowchart showing automatic setting of a specific area.

FIG. 7 is a diagram showing a structure of a photographing apparatus according to a second embodiment of the present invention.

FIG. 9 is a flowchart showing the entire operation in the photographing apparatus.

DESCRIPTION OF THE PREFERRED EMBODIMENTS

First Embodiment

Figure 2A:
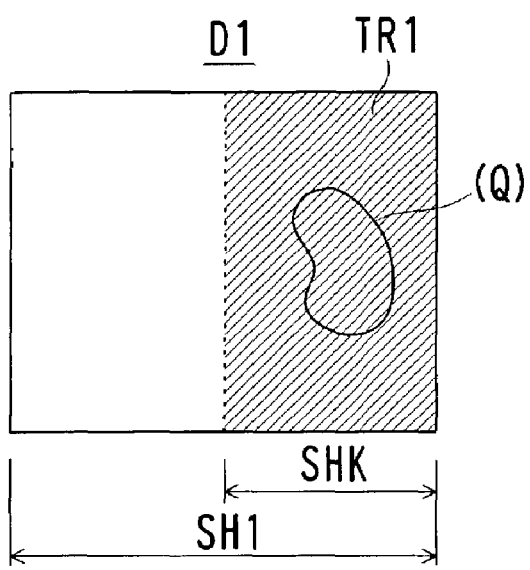
FIGS. 2A and 2B are diagrams showing an example of specific areas set in two images.
Figure 2B:
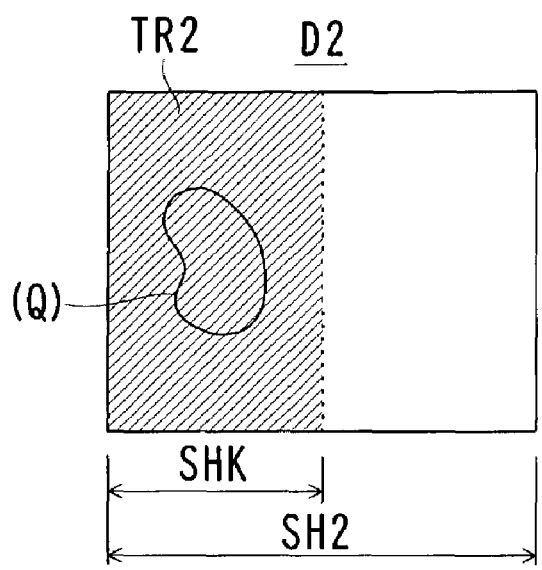
Figure 3A:
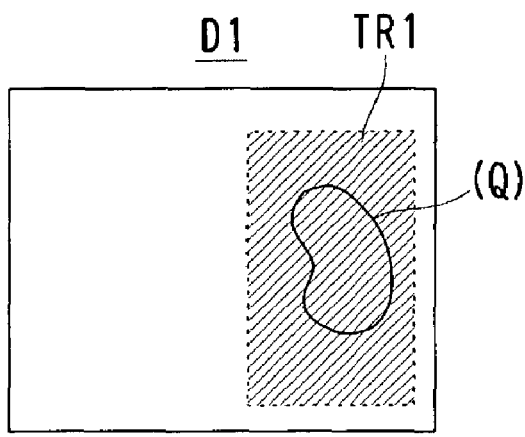
FIGS. 3A and 3B are diagrams showing another example of specific areas set in two images.
Figure 3B:
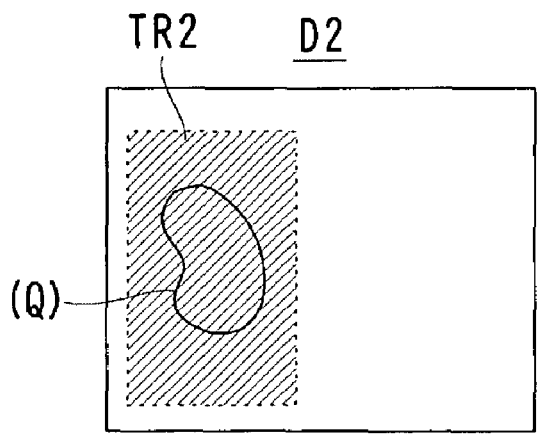
Figure 4:
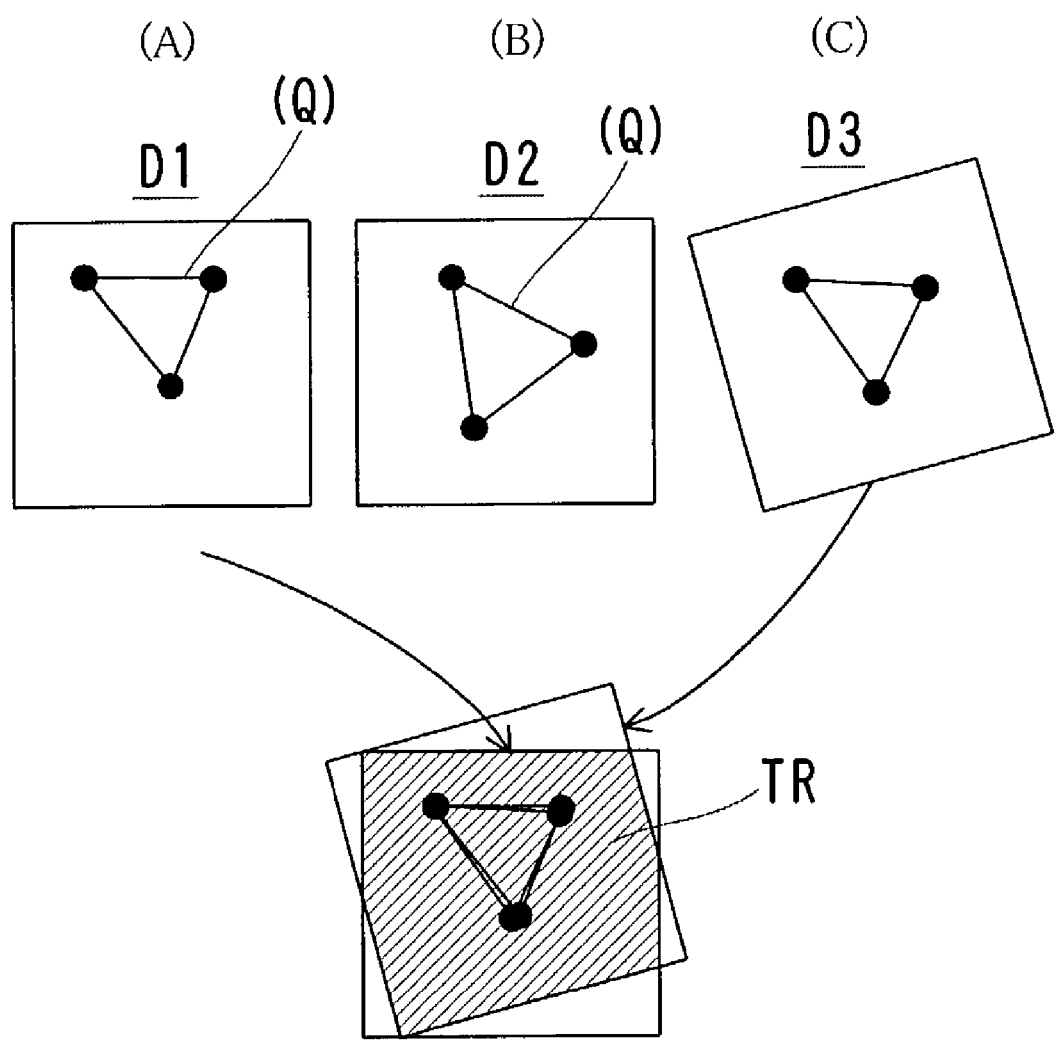
FIG. 4 shows an example of a method for setting a specific area automatically.

FIG. 1 is a diagram showing a structure of a photographing apparatus 1 according to a first embodiment of the present invention, FIGS. 2A and 2B are diagrams showing an example of specific areas TR1 and TR2 set in two images D1 and D2, FIGS. 3A and 3B are diagrams showing another example of the specific areas TR1 and TR2 set in the two images D1 and D2, and FIG. 4 shows an example of a method for setting a specific area TR automatically.

As shown in FIG. 1, the photographing apparatus 1 includes two cameras 11 and 12, an area setting portion 13 and a parameter calculation portion 14.

Each of the cameras 11 and 12 includes an image pickup device such as a CCD. The cameras 11 and 12 can photograph an object Q of measurement (an object to be shot) from viewpoint positions where the cameras 11 and 21 have parallax for the object Q. In order to simplify the description, it is supposed that optical axes of the two cameras 11 and 12 are parallel to each other. The cameras 11 and 12 are provided with photograph control portions 111 and 121 respectively, enabling individual photograph control based on camera parameters CP.

More specifically, the photograph control portions 111 and 121 electrically and mechanically control AE, AWB, AF (Auto Focus) and others of each of the cameras 11 and 12. There is a case where the camera parameters CP required for control by the photograph control portions 111 and 121 are set independently. However, the camera parameters CP can be obtained from the parameter calculation portion 14, as described below.

The cameras 11 and 12 have photographing areas SH1 and SH2 respectively, the photographing areas SH1 and SH2 being different from each other and being partially overlapped with each other. The overlapped part is a common photographing area SHK. The camera 11 outputs an image D1 of the photographing area SH1, while the camera 12 outputs an image D2 of the photographing area SH2. The images D1 and D2 are displayed on a monitor having a display screen of an appropriate size. Each of the images D1 and D2 includes a monitor image that is constantly photographed and output when the power supply of each of the cameras 11 and 12 is ON, and an image that is photographed and output when a shutter release button is pressed. Photographing is so performed that the object Q is included in the common photographing area SHK, ensuring that two images having parallax with respect to the object Q can be obtained.

The camera 11 may be integral with the camera 12 mechanically, or the cameras 11 and 12 that are separately structured may be connected to each other by a connection mechanism.

The area setting portion 13 is used for setting the specific area TR1 or TR2 within each of the photographing areas SH1 and SH2 of the cameras 11 and 12. The specific area TR1 or TR2 can be set for each of the cameras 11 and 12. Manual setting by a user is possible and automatic setting is also possible.

In setting the specific area TR1 or TR2, basically, an area TR where fields of view of the cameras 11 and 12 are overlapped with each other is made the specific area TR1 or TR2. As a method for setting the specific areas TR1 and TR2, there is a method in which an image is displayed on a display screen of a monitor in real time and a setting operation is performed while seeing the image. Alternatively, there is a method in which an area where fields of view are overlapped is previously determined by computing to set specific areas when the positional relationship among the cameras 11 and 12 and the object, and an approximate distance from the cameras to the object are known.

Stated differently, in the latter method, the area where fields of view are overlapped differs depending on a distance L away from the cameras 11 and 12. However, it is possible to specify a predetermined distance range and to determine the area where fields of view are overlapped beforehand by limiting a size or a position of the object Q as a measurement target. In determining the area where fields of view are overlapped beforehand, necessary camera parameters including a focal length of an optical system, a size of an image pickup device and an angle of view are used. These camera parameters are recognized by the photograph control portions 111 and 121 and memorized in an appropriate memory area.

Next, a setting example of the specific area TR1 or TR2 is described.

FIG. 2A shows the image D1 captured by the camera 11 and FIG. 2B shows the image D2 captured by the camera 12. The image D1 corresponds to the photographing area SH1 of the camera 11, while the image D2 corresponds to the photographing area SH2 of the camera 12. Shaded portions seen in the images D1 and D2 correspond to the common photographing area SHK.

For example, a user sets the common photographing area SHK as each of the specific areas TR1 and TR2. Here, the boundaries of the specific areas TR1 and TR2 in the images D1 and D2 differ according to the distance (background distance) L from the cameras 11 and 12 to a background surface HM1 shown in FIG. 1. FIGS. 2A and 2B show a case where the background distance is L1. The background distance L1 is a distance in which a supposed object Q is sufficiently included in the common photographing area SHK. Such a common photographing area SHK is set as each of the specific areas TR1 and TR2, so that the object Q appears in the specific areas TR1 and TR2.

The specific areas TR1 and TR2 that the user sets corresponding to the common photographing area SHK does not necessarily correspond to the common photographing area SHK accurately. Flexible setting is possible depending on purpose of measurement.

In the images D1 and D2 shown in FIGS. 3A and 3B, areas that are included in the specific areas shown in FIGS. 2A and 2B, are smaller than the same, and sufficiently include the object Q are set as specific areas TR1 and TR2. Neither of the specific areas TR1 and TR2 shown in FIGS. 3A and 3B corresponds to the common photographing area SHK accurately, and besides, the specific areas TR1 and TR2 are not identical to each other; for it is sufficient that each of the specific areas TR1 and TR2 includes the object Q or a portion of the object Q, the portion being desired for measurement. Thus, it is possible to set arbitrary areas where a user wish to obtain three-dimensional information as the specific area TR1 or TR2.

In order to manually set the specific area TR1 or TR2, for example, the area setting portion 13 may be so structured that the specific area TR1 or TR2 set on a display screen of a monitor is displayed by a closing line and, a cursor, a mouse or the like is operated to move the closing line. On this occasion, when the specific area TR1 or TR2 is set for one of the images D1 and D2, the common photographing area SHK may be automatically set as the specific area TR1 or TR2 for the other, correspondingly. In this case, one camera 11 is made a reference camera and the other camera 12 is made a referred camera, and then manual setting of the specific area TR may be performed only for an image of the reference camera (a reference image).

The parameter calculation portion 14 calculates the camera parameters CP using only image information in the set specific area TR. More specifically, with respect to luminance information, color information and information indicative of a focus state of each of the images D1 and D2, information obtained only from an image seen in the specific areas TR1 and TR2 is used to determine the camera parameters CP by operation. Then, the determined camera parameters CP are output to the cameras 11 and 12 to be set in the photograph control portions 111 and 121.

In determining the camera parameters CP, the parameter calculation portion 14 determines an average value of luminance and average values of respective color components in the set specific areas TR1 and TR2. Based on the determined values, the parameter calculation portion 14 determines camera parameters CP, such as ones equalizing luminance and color balance of the respective images in the specific areas TR1 and TR2. When calculation of the camera parameters CP equalizing both luminance and color balance is impossible, or, when calculation of such camera parameters CP requires much time, camera parameters CP, such as ones equalizing either only luminance or color balance may be calculated.

As an average value of luminance and average values of respective color components, a value obtained by simple arithmetic average or mean square can be used, or a weighted average value in which a central portion of the specific area TR1 or TR2 has a large weight can be used.

Next, an example for determining the camera parameters CP based on an average value of luminance and average values of respective color components is explained. However, various methods other than this example can be adopted for determining the camera parameters CP. Also, the method for determining the camera parameters CP differs depending on characteristics of the camera.

The camera parameters CP for AE can be determined as follows.

Supposing that the current light exposure of a camera is denoted by E and an increase of light exposure is denoted by $\Delta E$, E and $\Delta E$ are expressed in the following equalities (1) and (2).

$$E = \log_2 t + k_1 x + k_2 \qquad (1)$$

$$\Delta E = \log_2 (A/v) \qquad (2)$$

Here, t denotes the current shutter speed, x denotes the current gain value, k1 and k2 are constants, v denotes an average value of luminance and A denotes a target value of luminance. The gain x depends on diaphragm of the camera and sensitivity of an image pickup device.

Then, new light exposure E' after change is defined as $E' = E + \Delta E$, and new shutter speed t' and a new gain x' are determined so as to satisfy the following equality (3).

$$E' = \log_2 t' + k_1 x' + k_2 \qquad (3)$$

The shutter speed t' and the gain x' are not always determined uniquely.

The camera parameters CP for AWB can be determined as follows.

For example, in an RGB color image, when G is a reference, an average value of R components is denoted by r, an average value of G components is denoted by g and an average value of B components is denoted by b. Then, when Gr, Gg and Gb are defined as white balance values corresponding to R components, G components and B components, respectively, it is determined that Gr=g/r, Gg=1 and Gb=g/b.

The camera parameters CP determined as described above are set in the photograph control portions 111 and 121. In accordance with the set camera parameters CP, the photograph control portions 111 and 121 perform photograph control, and photographing is performed for the same photographing areas as those when the camera parameters CP are set. In this way, two images D1 and D2 are obtained anew. Corresponding points are determined automatically or manually for the obtained images D1 and D2 to generate three-dimensional information such as distance images of the object Q seen in the images D1 and D2.

Next, an example of a method for automatic setting of a specific area TR is described.

(A) and (B) of FIG. 4 show the images D1 and D2 captured by the cameras 11 and 12, respectively. One image D1 is a reference image and the other image D2 is a referred image. Each of the images D1 and D2 include an image of an object Q, however, the image of the object Q is not identical to each other due to parallax.

First, three or more corresponding points in each of the images D1 and D2 are extracted. The extraction of the corresponding points can be achieved by automatic calculation using characteristic points in the images, or achieved by user's manual operation for designating the corresponding points while seeing the images. As shown in (A)-(D) of FIG. 4, each of the corresponding points is denoted by a dot.

Then, projective transformation is determined to transform coordinates of corresponding points on the image D2 to coordinates of corresponding points on the image D1. The projective transformation is coordinate transformation expressed by the following equality (4).

$$\begin{pmatrix} a & b & c \\ d & e & f \\ g & h & i \end{pmatrix} \begin{pmatrix} x \\ y \\ 1 \end{pmatrix} = s \begin{pmatrix} x' \\ y' \\ 1 \end{pmatrix} \qquad (4)$$

Here, (x, y) are coordinates before transformation, (x', y') are coordinates after transformation and s represents parameters.

$$\begin{pmatrix} a & b & c \\ d & e & f \\ g & h & i \end{pmatrix}$$

is a matrix showing transformation.

Some kind of constraint conditions may be given in determining the projective transformation. Among the constraint conditions are, for example, limitation to affine transformation, use of known camera parameters and others.

Next, the entire image D2 is transformed by the determined projective transformation. The transformed image is shown as an image D3 in (C) of FIG. 4. Then, as shown in (D) of FIG. 4, the image D3 is overlaid on the image D1. In (D) of FIG. 4, a portion where the image D3 is overlaid on the image D1 is regarded as an area where fields of view are overlapped, then this area is set as the specific area TR.

As another example of a method for automatic setting of the specific area TR, an area where an object Q is seen may be automatically extracted to set the extracted area as the specific area TR.

Next, an operation in the photographing apparatus 1 is described with reference to a flowchart.

FIG. 5 is a flowchart showing the entire operation in the photographing apparatus 1, and FIG. 6 is a flowchart showing automatic setting of a specific area TR.

Referring to FIG. 5, plural cameras are used to obtain plural images (#11). A specific area TR is set for each of the images (#12), and only image information of the specific area TR is used to determine camera parameters CP (#13). Based on the determined camera parameters CP, photograph control is performed for each of the cameras to obtain plural images (#14). Corresponding points in the obtained plural images are extracted (#15) to generate three-dimensional information in accordance with the corresponding points (#16).

Referring to FIG. 6, in order to set a specific area TR, at least three corresponding points are extracted for each of plural images (#21). The corresponding points are used to carry out projective transformation for a referred image to overlay the referred image on a reference image (#22). A portion where the referred image is overlaid on the reference image is extracted as a specific area TR (#23).

The processing in step #21 corresponds to means for obtaining corresponding points according to the present invention, and the processing in steps #22 and #23 correspond to means for setting an area as a specific area according to the present invention.

In the embodiment described above, the photographing apparatus 1 may be an integrated structure where all elements are incorporated into a housing. Further, the cameras 11 and 12 may be structurally separated from the area setting portion 13 and the parameter calculation portion 14. Furthermore, the cameras 11 and 12 and the area setting portion 13 may be structurally separated from the parameter calculation portion 14. Moreover, the area setting portion 13 or the parameter calculation portion 14 may be realized by a personal computer.

Second Embodiment

Next, a photographing apparatus 1B according to a second embodiment is described. Here, only differences between the photographing apparatus 1B and the photographing apparatus 1 according to the first embodiment are described. Accordingly, portions that are not described in the second embodiment are similar to portions in the first embodiment.

FIG. 7 is a diagram showing a structure of the photographing apparatus 1B according to the second embodiment of the present invention, and FIGS. 8A-8F are diagrams for describing weighting to image information.

Figure 8A:
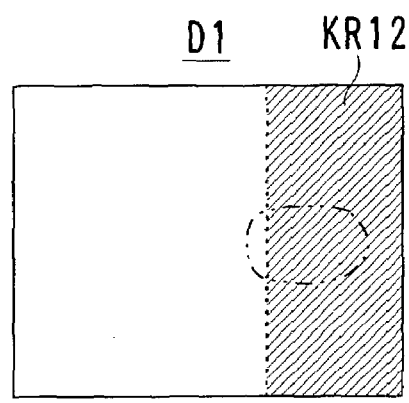
FIGS. 8A-8F are diagrams for describing weighting to image information.
Figure 8B:
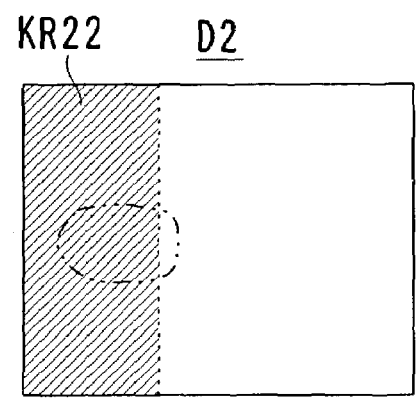
Figure 8C:
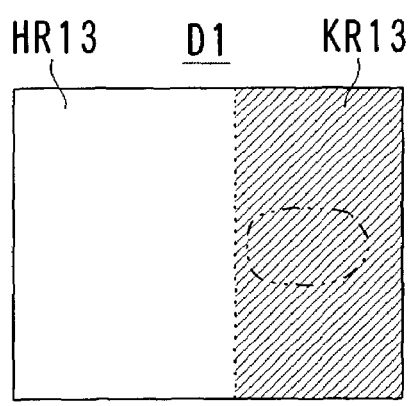
Figure 8D:
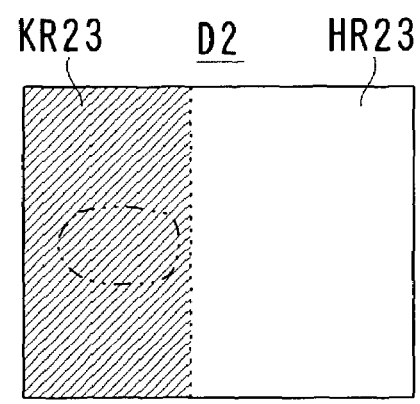
Figure 8E:
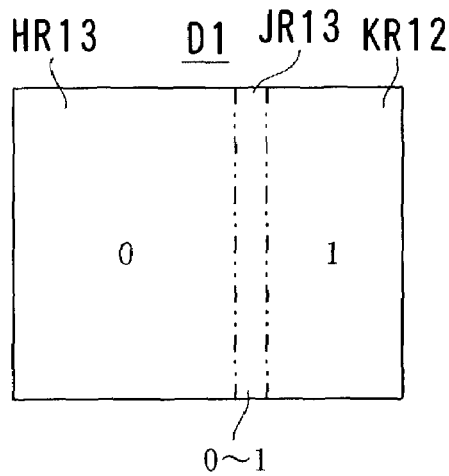
Figure 8F:
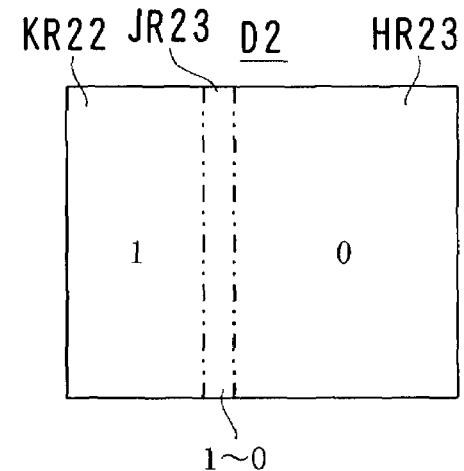

FIGS. 8A and 8B show common areas KR12 and KR22 corresponding to a background surface HM2 shown in FIG. 7, respectively. FIGS. 8C and 8D show common areas KR13 and KR23 corresponding to a background surface HM3 shown in FIG. 7, respectively. FIGS. 8E and 8F show examples of a weight (a weighting coefficient) corresponding to each area of the images D1 and D2.

In calculating camera parameters CP, the photographing apparatus 1B uses values weighted depending on possibility that fields of view of the cameras 11 and 12 are overlapped with each other for the entire image information of the images D1 and D2, differently from the first embodiment in which only image information within the specific area TR1 or TR2 is used.

More specifically, a weighting portion 13B performs weighting to the images D1 and D2 so that a weight is larger in an area where possibility that fields of view are overlapped is high. In an area without possibility that fields of view are overlapped, a weight is made 'zero'. In calculating the possibility that fields of view are overlapped, necessary camera parameters including a supposed position for an object Q as a measurement target, i.e., a distance L, and a focal length of an optical system are used.

A parameter calculation portion 14B determines a weighted average value of luminance or weighted average values of respective color components of the images based on the weighting, to calculate camera parameters CP in accordance with the weighted average value.

Weighting processing in the weighting portion 13B is described in more detail.

With respect to the images D1 and D2, the weighting portion 13B determines possibility that fields of view are overlapped for each area of the images.

More specifically, as shown in FIG. 7, a common photographing area SHK common to the two cameras 11 and 12 varies according to a position of a background surface HM, that is, background distances L2 and L3 from the cameras 11 and 12 to the background surfaces HM2 and HM3, as referred to earlier. Here, it is supposed that an object Q is known to be present between the distances L2 and L3.

Referring to FIGS. 8A and 8B, between the distances L2 and L3, the common areas KR12 and KR22 corresponding to the background surface HM2 are included in an area where fields of view are overlapped without exception. On the contrary, referring to FIGS. 8C and 8D, between the distances L2 and L3, areas HR13 and HR23 other than the common areas KR13 and KR23 corresponding to the background surface HM3 are not included in an area where fields of view are overlapped without exception.

With respect to an area JR13 between the common area KR12 and the area HR13, and an area JR23 between the common area KR22 and the area HR23, i.e., an area that is included in the common area KR13 and not included in the common area KR12, and an area that is included in the common area KR23 and not included in the common area KR22, possibility of being included in an area where fields of view are overlapped is middle between the case of FIGS. 8A and 8B and the case of FIGS. 8C and 8D. When the possibility of being included in an area where fields of view are overlapped in a distance L4 that is present between the distances L2 and L3 is denoted by probability $\alpha$, the probability $\alpha$ is determined by the following equality (5).

$$\alpha = (L3-L4)/(L3-L2) \tag{5}$$

This equality is a simple example for determining the probability $\alpha$, and other methods may be used to determine the probability $\alpha$.

Then, based on the probability $\alpha$, a weight is determined. As the most simplified example, the probability $\alpha$ of being included in an area where fields of view are overlapped, for example, a value of the right-hand side of the equality (5) mentioned above, which is $(L3-L4)/(L3-L2)$, can be adopted as a weight without any change.

As long as a weight becomes larger with increase in the probability $\alpha$, other various methods may be used to determine a weight. For example, instead of being linearly proportional to the probability $\alpha$, a weight may vary in the form of a quadratic curve or may vary in the form of a broken line graph by plural straight lines having different gradients.

Concerning the method of weighting mentioned above, it is also possible to think as follows.

More specifically, it is thinkable that a value corresponding to possibility that an object Q is present in the image D1 or D2 is used as a weight.

As shown in FIGS. 8A and 8B, possibility that an object Q is present is high with respect to the common areas KR12 and KR22 corresponding to the background surface HM2. For example, when the size of the object Q is as same as the common photographing area SHK (shown by heavy lines in FIG. 7) corresponding to the background surface HM2, the possibility that the object Q is photographed in the common areas KR12 and KR22 is "1". Accordingly, "1" is given as weights for the common areas KR12 and KR 22.

On the contrary, as shown in FIGS. 8C and 8D, there is 0% probability that the object Q is seen in the areas HR13 and HR23 other than the common areas KR13 and KR23 corresponding to the background surface HM3. Stated differently, weights are "zero" for the areas HR13 and HR23.

The possibility that the object Q is photographed is between 0% and 100% in the middle area JR13 between the common area KR12 and the area HR13, and in the middle area JR23 between the common area KR22 and the area HR23. Accordingly, weights for the areas JR13 and JR23 are set to appropriate values between "zero" and "1". In this way, weights can be determined.

Next, an operation in the photographing apparatus 1B is described with reference to a flowchart.

FIG. 9 is a flowchart showing the entire operation in the photographing apparatus 1B.

Referring to FIG. 9, plural cameras are used to obtain plural images (#31). With respect to the entire area of each of the images, weighting is performed in accordance with possibility that fields of view are overlapped for each area (#32). Values weighted to the entire image information are used to determine camera parameters CP (#33). Based on the determined camera parameters CP, photograph control is performed for each of the cameras to obtain plural images (#34). Corresponding points in the obtained plural images are extracted (#35) to generate three-dimensional information based on the corresponding points (#36).

As described above, in the first embodiment, AE and AWB are performed based on only image information of a specific area TR where fields of view are overlapped when plural corresponding points and an area where fields of view are overlapped are known between plural images. This enables luminance and color balance in an area where fields of view are overlapped to be uniformed, resulting in accurate correspondence of images with ease. For example, even when light for illuminating an object Q is seen in one of two images, an operation is so performed that the light is prevented from entering the specific area TR, eliminating imbalance of luminance due to influence of the light. Consequently, measurement of an object can be conducted precisely.

In the second embodiment, even when an area where fields of view are overlapped is uncertain, weighting is performed using probability that a position of a supposed object Q is included in an area where fields of view are overlapped depending on a distance away from the object Q. Then, AE and AWB are performed based on image information subjected to the weighting. This enables luminance and color balance in an area where fields of view are overlapped to be close to each other.

As an example of a method for AE control, image contrast is adjusted so as to maximize contrast for each camera. In order to determine contrast, for example, density differences between neighboring pixels are added together so as to maximize the sum value. In the case of the second embodiment, density differences between neighboring pixels are multiplied by the probability $\alpha$ so that the sum value is maximized.

In the two embodiments described above, explanation is made for the case where AE and AWB are performed. In lieu of AE and AWB or together with AE and AWB, automatic focus control (AF) of each camera is also possible to achieve optimal focus. Besides, camera parameters CP other than AE, AWB and AF may be controlled.

In the embodiments described above, the two cameras 11 and 12 may be so placed that optical axes thereof intersect instead of being parallel to each other. Though the two cameras 11 and 12 are used in the embodiments, three or more cameras can be used. The area setting portion 13 and the parameter calculation portion 14 in the photographing apparatus 1, the weighting portion 13B in the photographing apparatus 1B and others can be realized by a hardware circuit or software by using a CPU and a memory, or by combining the hardware and the software.

The structure of each portion of the photographing apparatuses 1 and 1B or the entire structure thereof, the circuit thereof, the shape thereof, the size thereof, the number thereof, the processing contents thereof and others can be modified in the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for measuring an object based on images comprising:
   capturing the images by plural cameras;
   using more image information obtained from an image in a photographing area common to the images captured by the cameras than image information obtained from an image in an area other than the common photographing area to set camera parameters;
   using the set camera parameters to photograph the same photographing areas as those when the camera parameters are set so as to capture images anew, the photographing being performed by the cameras;
   determining corresponding points in the newly captured images; and
   obtaining, from the newly captured images, three-dimensional information of the object included in a photographing area.

2. The method according to claim 1, wherein the common photographing area is set by a user.

3. The method according to claim 1, wherein the common photographing area is set automatically.

4. The method according to claim 1, wherein the image information obtained from the image in the common photographing area is weighted depending on an area.

5. The method according to claim 4, wherein the weighting is performed based on a distance away from the camera.

6. The method according to claim 5, wherein the weighting is so performed that a weight of a first area corresponding to the common photographing area in the nearest distance from the camera within a predetermined distance range is set to a maximum value, a weight of a second area corresponding to an area other than the common photographing area in the farthest distance from the camera within the predetermined distance range is set to a minimum value and a weight of an area between the first area and the second area is set to an appropriate value from the minimum value to the maximum value.

7. The method according to claim 1, wherein the image information obtained from the image in the common photographing area includes an average value of luminance in the image or average values of respective color components in the image.

8. The method according to claim 1, wherein the camera parameters serve to control light exposure or white balance.

9. A photographing apparatus comprising:
    plural cameras configured for photographing an object from viewpoint positions where the cameras have parallax for the object, and for performing individual photograph control based on camera parameters;
    a setting portion for setting a specific area within a photographing area of at least two of the cameras, the specific area including a portion that is a photographing area common to said at least two cameras;
    a calculation portion for calculating camera parameters for each of said at least two cameras using only image information in the specific area; and
    a photograph control portion for performing photograph control of said at least two of the cameras based on each of the calculated camera parameters.

10. The photographing apparatus according to claim 9, wherein the setting portion includes:
    an obtaining portion for obtaining at least three corresponding points with respect to respective images photographed by the cameras; and
    a setting portion for defining one of the images as a reference image and the other as a referred image to set an area where both of the images are overlapped with each other when the referred image is so transformed that the corresponding points in the referred image is overlaid on the corresponding points in the reference image as the specific area.

11. The photographing apparatus according to claim 9, wherein the specific area is set by a user.

12. The photographing apparatus according to claim 9, wherein when the specific area is set for the image captured by one of the cameras, an area corresponding to the specific area is set automatically for the image captured by the other camera.

13. The photographing apparatus according to claim 9, wherein the specific area is an area corresponding to a photographing area common to the images captured by the cameras, and the common photographing area is set automatically.

14. The photographing apparatus according to claim 9, wherein the image information includes an average value of luminance in the image.

15. The photographing apparatus according to claim 9, wherein the image information includes average values of respective color components in the image.

16. The photographing apparatus according to claim 9, wherein the camera parameters serve to control light exposure.

17. The photographing apparatus according to claim 9, wherein the camera parameters serve to control white balance.

18. A photographing apparatus comprising:
    plural cameras configured for photographing an object from viewpoint positions where the cameras have parallax for the object, and for performing individual photograph control based on camera parameters;
    a weighting portion for determining weighting information for areas within a photographing area of the cameras, such weighting information being determined such that a weight is larger in an area where possibility that fields of view are overlapped is high within a photographing area of each of the cameras;
    a calculation portion for calculating each of the camera parameters using image information obtained from the cameras and as well as said weighting information, each portion of the image information being weighted by the weighting information that corresponds to the area from which the portion of image information is obtained; and
    a photograph control portion for performing photograph control of each of the cameras based on each of the calculated camera parameters.

19. The photographing apparatus according to claim 18, wherein the weighting is performed based on a distance away from the camera.

20. The photographing apparatus according to claim 18, wherein the weighting portion performs weighting so that a weight of a first area corresponding to a common photographing area in the nearest distance from the camera within a predetermined distance range is set to a maximum value, a weight of a second area corresponding to an area other than the common photographing area in the farthest distance from the camera within the predetermined distance range is set to a minimum value and a weight of an area between the first area and the second area is set to an appropriate value from the minimum value to the maximum value.

* * * * *